(12) United States Patent
Leonard

(10) Patent No.: US 9,432,437 B1
(45) Date of Patent: Aug. 30, 2016

(54) DYNAMIC TELEMETRY CLIENT MESSAGE ROUTING

(71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 479 days.

(21) Appl. No.: 13/967,345

(22) Filed: Aug. 15, 2013

(51) Int. Cl.
*G06F 15/16* (2006.01)
*H04L 29/08* (2006.01)

(52) U.S. Cl.
CPC .................................... *H04L 67/02* (2013.01)

(58) Field of Classification Search
CPC ....................................................... H04L 67/02
See application file for complete search history.

(56) References Cited

U.S. PATENT DOCUMENTS

| 8,732,258 | B2* | 5/2014 | Seminaro | .............. | H04L 67/025 709/207 |
| 2005/0278410 | A1* | 12/2005 | Espino | ................ | H04L 67/2823 709/201 |
| 2011/0067101 | A1* | 3/2011 | Seshadri | ............... | G06F 21/552 726/22 |

* cited by examiner

*Primary Examiner* — Jason Recek

(57) ABSTRACT

A dynamic telemetry client message routing system is provided. The system comprises a provisioning application stored in a memory of a computer system that, when executed by the processor of the computer system, receives a request from a telemetry client to register for message routing services; the request comprising a client identity. The provisioning application creates an entry in a data store associating the client identity with a broker group identity and a queue manager alias and a time to live value. The provisioning application sends a request to a route builder to configure the queue manager alias into the broker group. The route builder sends a message to the broker group to configure the queue manager alias. The message broker receives a request to send a message to the telemetry client and transmits the message and the queue manager alias of the broker group accessed from the data store.

20 Claims, 9 Drawing Sheets

DYNAMIC TELEMETRY CLIENT MESSAGE ROUTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Message queues may provide asynchronous communications between software applications, meaning the sender and receiver of a message may or may not interact with the message queue at the same time. A message placed onto the queue is stored until the recipient retrieves it. Message queues have implicit or explicit limits on the size of data that may be transmitted in a single message and the number of messages that may remain outstanding on the queue. Many Implementations of message queues function internally: within an operating system or an application.

SUMMARY

In an embodiment, a dynamic telemetry client message routing system is disclosed. The system comprises at least one computer system, each computer system comprising at least one memory and one processor. The system also comprises a provision service application stored in a memory of the at least one computer system that, when executed by a processor of the at least one computer system, receives a request from a telemetry client to register for message routing services; the request comprising a client identity of the telemetry client which in response to receiving the request to register for message routing services creates an entry in a data store associating the client identity with a broker group identity and a queue manager alias and comprising a time to live value. In response to the creation of the data entry, the provisioning application sends a request to a route builder application to configure the queue manager alias into a broker group identified in the entry in the data store. The route builder application stored in a memory of the at least one computer system that, when executed by a processor of the at least one computer system, receives a request from the provisioning service application to configure the queue manager alias into the identified broker group, sends a message to the identified broker group to configure the queue manager alias into the identified broker group, and removes entries form the data store that comprise an expired time to live. In response to the configuration of the queue manager alias, the message broker stored in a memory of the at least one computer system that, when executed by a processor of the at least one computer system receives a request to send a message to the telemetry client, wherein the request to send the message comprises the client identity of the telemetry, and transmits the message and the queue manager alias to the broker group accessed from the data store.

In an embodiment, a method of provisioning a dynamic telemetry client message routing system is disclosed. The method comprises a system receiving a first request to register for message routing services from a first telemetry client, wherein the request to register for message routing services comprises a first client identity of the first telemetry client. In response to receiving the first request to register for message routing services automatically creating a first entry in a data store comprising the first client identity of the first telemetry client, a broker group identity, a first queue manager alias associated with the first telemetry client, and a first time to live, wherein the first time to live is a value determined by a subscription of the first telemetry client for message routing services; sending an address of a broker group identified by the broker group identity to the first telemetry client, and provisioning the first queue manager alias into the broker group.

In an embodiment a method of transmitting a control command to a mobile communication device is disclosed. The method comprises the broker group receiving a subscription request from a mobile communication device comprising a client identity. The method further comprises a message broker receiving a message that comprises the first client identity. The method further comprises the message broker accessing an entry in a data store based on the client identity, wherein the entry comprises a time to live value, a broker group identity, and queue manager alias. The method further comprises the message broker sending the message and the queue manager alias to the broker group. In response to receiving the message and the queue manager alias, the broker group validates the queue manager alias, determines that the mobile communication device is subscribed to receive the message, and sends the message to the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
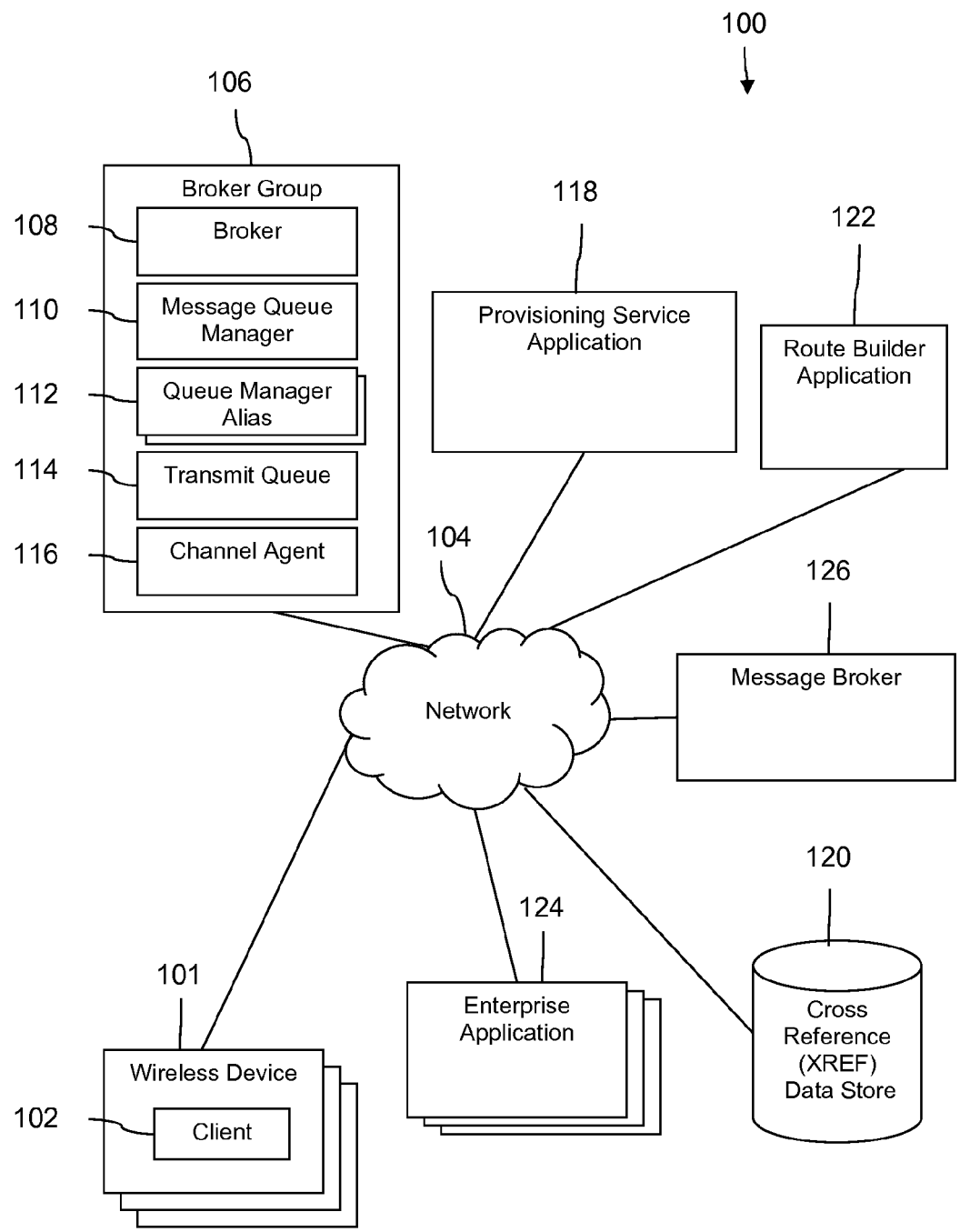
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for a dynamic telemetry message routing system. The system comprises clients that send messages about a topic to a message broker as well as other clients that register to receive messages associated with one or more topics. With a queue manager alias and time to live value assigned to each client, the dynamic telemetry message routing system can ensure that each client trying to complete a function is a reputable client; each client that does not have a queue manager alias may be brought in to question and may be blocked to ensure proper security of the dynamic telemetry message routing system. To avoid being blocked, a client simply subscribes to a topic, for example, a vehicle door unlock command, goes through a provisioning sequence and then uses the benefits for a full time to live period. If a fraudulent client manages to complete the provisioning process, they are forced out after the time to live period assigned to the queue manager alias of the client.

The disclosure describes a provisioning sequence and an application function sequence of the dynamic telemetry message routing system. During the provisioning sequence, the client sends a message to a provisioning application at a well-known internet protocol address. The provisioning application then creates an entry in a cross reference data store and also transmits the client identity to a message broker. The message broker establishes a time to live value and writes the time to live value to the entry in the data store. The provisioning application then sends a route activation message to a route builder application to activate the route between the client and a broker group. The route builder application also creates a queue manager alias to set authority for clients by referring to the cross reference data store and viewing the entry that corresponds with the client identity and time to live value of the queue manager alias. The route builder stores the configuration of the queue manager alias into an appropriate broker group that is associated with the client identity. Then the provisioning application sends a message to the client which contains the new queue manager alias/broker configuration of the broker group which the client will use as a way to access content. The client stores this information into its persistent memory, completing the provisioning sequence.

The application function sequence comprises an enterprise application establishing a connection with the message broker. The message broker then awaits incoming messages from clients. A client publishes an application message on a specific topic to a broker group. The application message's topic header contains the location of the enterprise application which will perform the requested task in the message. The broker group then sends the application message to the message broker. The message broker sends the application message to the enterprise application which performs the requested function identified by the application message. In some embodiments, this may be the end of the application function sequence. In an embodiment, the enterprise application formulates a reply message containing the client identity which the enterprise application sends to the message broker. The message broker receives the reply message and pulls the client identity from the header of the message. The message broker reads the client identity from the header of the reply message and refers to a cross reference data store so it may direct the reply message to proper broker group using a queue manager alias. The message broker then sends the message to the broker group of the second client. A component of the system known as an object authority manager uses the security settings of the queue manager alias to authorize resolution to the broker group. With resolution granted, the broker group sends the reply message to the client via a well-known internet protocol address.

Turning now to FIG. 1, a communication system 100 is described. In an embodiment, the system 100 is based on messaging middleware software. In an embodiment, the messaging middleware software may be implemented using message queue software and message queue telemetry transport software from IBM. The system 100 comprises a plurality of wireless devices 101, and a plurality of respective clients 102. The plurality of wireless devices 101 may comprise mobile phones, personal digital assistants (PDA), media players, in vehicle head units, in vehicle telematics units, or other communication enabled portable electronic devices. In an embodiment, the wireless devices 101 may be implemented as handsets. Details of handsets are discussed in more detail hereinafter. The system 100 may further comprise a network 104. In an embodiment, it is well known that in order for the plurality of wireless devices 101 to couple with the network 104, the wireless devices 101 may use a plurality of base transceiver stations (BTS) associated with the network 104. In an embodiment, base transceiver stations (BTS) may provide a wireless communication link to the plurality of wireless devices 101 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol.

The system 100 may further comprise a broker group 106 that is coupled to the network 104. The broker group 106 may further comprise a broker 108, a message queue manager 110, a plurality of queue manager aliases 112, a transmit queue (XMIT queue) 114, and a channel agent 116. The system 100 further comprises a provisioning services application 118, a cross reference data store (XREF data store) 120, a route builder application 122, a plurality of enterprise applications 124, and a message broker 126. In an embodiment, the plurality of enterprise applications 124 may be used to accomplish any number of processes or functions. In an embodiment, the broker group 106 and its respective components, the provisioning service application 118, the cross reference data store 120, the route builder application 122, the plurality of enterprise applications 124, and the message broker 126 may function on any number of computers, whether there is one computer or a plurality of computers. In an embodiment, the plurality of wireless devices 101 may not initially have the capability for dynamic telemetry client message routing. If the wireless device 101 and/or the client 102 does not have the capability to engage in dynamic telemetry client message routing, the wireless device 101 and/or client 102 may engage in a provisioning sequence.

Figure 2:
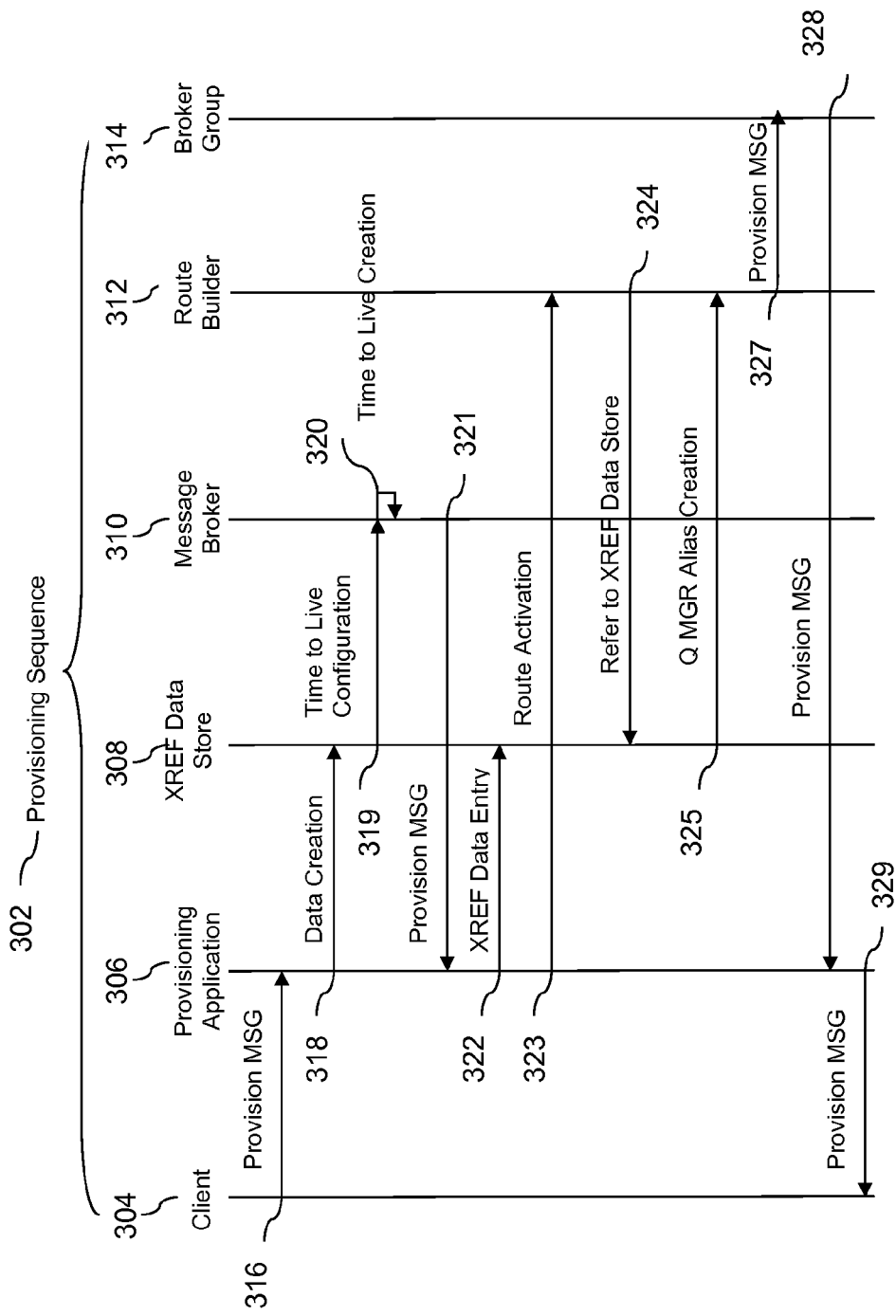
FIG. 2 is a message sequence diagram of a method according to an embodiment of the disclosure.

In FIG. 2, a message sequence diagram of a provisioning sequence 302 is shown. In an embodiment, the provision sequence 302 provisions the client 304 to communicate with a broker group using the dynamic telemetry client message routing process.

In an embodiment, at block 316, the client 304 sends a provisioning message to the provisioning application 306 at a well-known internet protocol address. The client 304 may do this to provision itself to receive and send dynamic telemetry client messages. At block 318 the provisioning application 306 creates data to be entered in a cross reference data store (XREF data store) 308. In an embodiment, the cross reference data store 308 may hold information including a client identity of the client 304, a time to live value, and the information of the location of the broker group 314. In an embodiment, the client identity is a code that is associated with the client. In an embodiment, access to the cross reference data store 308 may be restricted to the message broker 310 and the provisioning application 306. At block 319, the cross reference data store 308 transmits the message from the provisioning application 306 to the message broker 310 to configure a time to live value. In an embodiment, the time to live value is parallel to a subscription period that the client has to utilize the functionality of the dynamic telemetry client message routing system. In an embodiment, the time to live value may be a period of time that includes a month, three months, six months, a year, or two years. At block 320, the message broker 310 creates a time to live value. At block 321, the message broker 310 transmits the time to live value in a provisioning message back to the provisioning application 306. At block 322, the provisioning application 306 enters the data into the cross reference data store 308. At block 323, the provisioning application sends a message to the route builder 312 for route activation. At block 324, the route builder 312 refers to the cross reference data store 308 to create a queue manager alias. In an embodiment, the queue manager alias is created using the client identity of the client 304. In an embodiment, the queue manager alias is the feature that allows for the dynamic telemetry message routing to occur. In an embodiment, the mapping of the client identity to the queue manager alias is via the cross reference data store 308 which helps to secure the dynamic telemetry message routing system.

At block 325, the route builder 312 creates the queue manager alias using the client identity found in the cross reference data store 308. At block 327, the route builder 312 sends a message that contains the queue manager alias to the broker group 314. The broker group 314 then stores the queue manager alias configuration. In an embodiment, the address of the broker group 314 is that of an internet protocol address and port number of the broker group 314. At block 328, the broker group 314 sends a provisioning message to the provisioning application 306 that confirms that the broker group 314 has stored the queue manager alias. At block 329, the provisioning application 306 sends a provisioning message which contains the new queue manager alias configuration to the client 304. The client 304 stores the information from the provisioning message into its persistent memory, ending the provisioning sequence 302.

Figure 3:
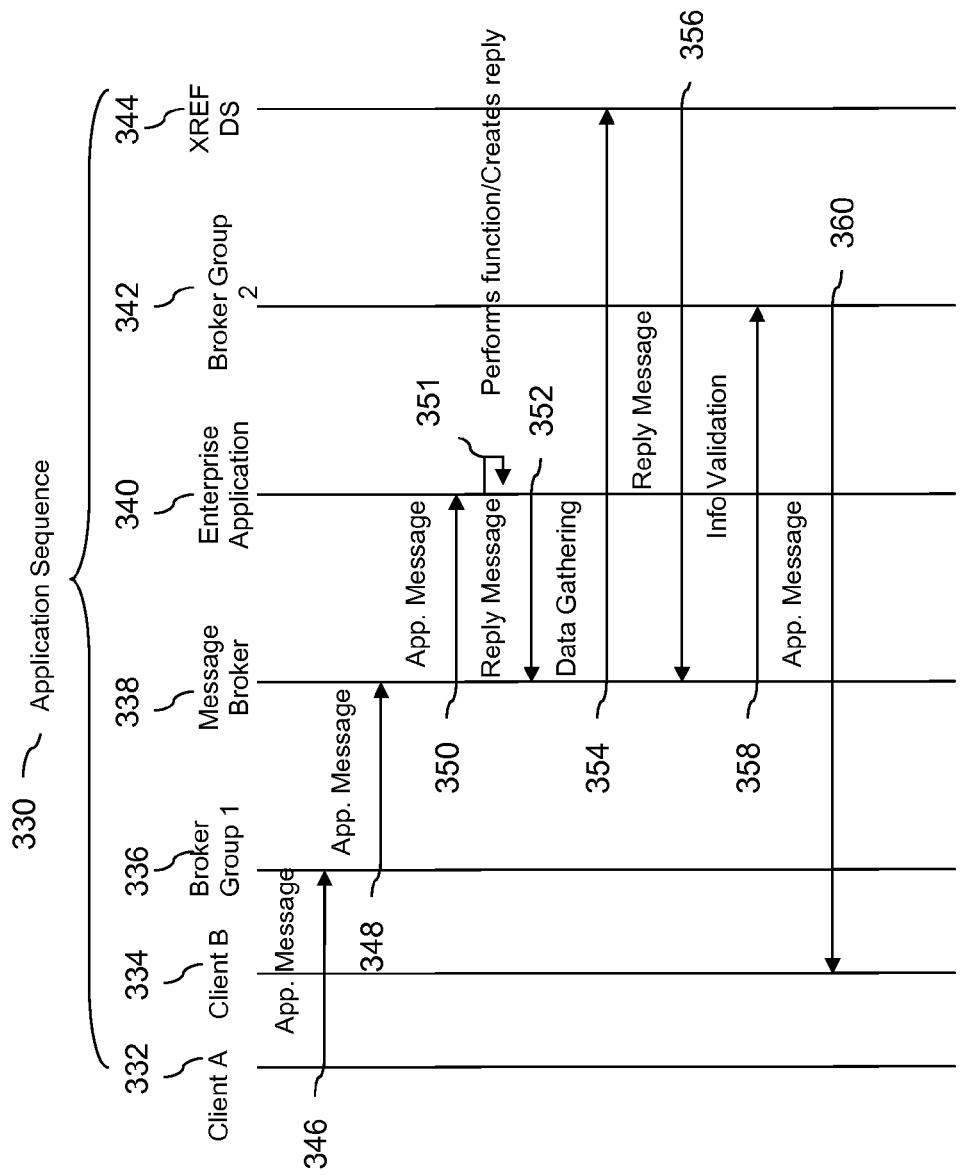
FIG. 3 is a message sequence diagram of a method according to an embodiment of the disclosure.

In FIG. 3, a message sequence diagram of an application sequence 330 is shown. In an embodiment, the application sequence 330 propagates a door unlock command, wherein the telemetry client, client B 334, is installed in a telematics unit of a vehicle, and wherein when the telemetry client, client B 334, receives the message it commands the telematics unit to unlock the doors of a vehicle. In an embodiment, the broker groups 336/342 may comprise brokers, message queue managers, queue manager aliases, transmit queues, and channel agents. In an embodiment, the application sequence 330 may occur when clients 332/334 are provisioned with the capability for dynamic telemetry client message routing.

In an embodiment, the enterprise application 340 may have an established connection with the message broker 338. The message broker 338 awaits messages from broker groups. In an embodiment, at block 346, the client A 332 sends an application message to the first broker group 336 on a specific topic to the queue manager/broker within the first broker group 336. In an embodiment, the application message indicated at block 346 comprises the client identity of client A 332 and a topic identity, wherein the enterprise application 340 is subscribed to receive messages about the topic identity. In an embodiment, the topic is associated with the enterprise application 340. In an embodiment, the final destination of the application sequence is client B 334. At block 348, the first broker group 336 relays the application message to the message broker 338. At block 350, the message broker 338 transmits the application message to the enterprise application 340. At block 351, the enterprise application 340 performs the requested function. In an embodiment, this might be the end of the application sequence 330 depending on the task the enterprise application 340 is attempting to accomplish. In an embodiment, a task may include unlocking a car door, remote startup of a car, etc. At block 351, the enterprise application 340 also creates a reply message. At block 352, the enterprise application 340 sends the reply message to the message broker 338. In an embodiment, the reply message may contain the client identity of the second client B 334. At block 354 the message broker 338 pulls the client identity from the reply message and gathers data from the cross reference data store 344.

The message broker 338 also validates that the client identity contained in the reply message is the correct client identity of the Client B 334. At block 356, the cross reference data store 344 transmits the information back to the message broker 338 in the form of a reply message. At block 358, the message broker 338 sends a message for information validation to the second broker group 342. The message broker 338 sends the message which is addressed to queue manager alias of the second broker group 342. In an embodiment, the second broker group 342 receives the message 358 and the queue manager alias from the message broker 338, verifies that the queue manager alias is configured in the identified second broker group 342, and verifies that the enterprise application 340 is authorized to send the message indicated by block 352. The second broker group 342 receives the message via the message queue manager which is associated with the broker associated with the queue manager alias which is associated with the client identity of client B 344, found in the cross reference data store 334.

Once the message indicated at block 358 reaches the message queue manager, an object authority manager uses the queue manager alias's security settings to authorize resolution to the transmit queue. In an embodiment, the object authority manager is a component that goes through a separate process which handles authority checking for any connection or write requests to message queue objects. In an embodiment, the transmit queue is the component within the second broker group 342 that shows where the final destination of the application sequence 330 is located. The transmit queue creates a transmit header which shows the client identity for the client B 334 and a topic of a new message. At block 360, the channel agent of the second broker group 342 reads the message from the transmit queue and sends a new message to the connected client B 334 via a well-known internet protocol address.

Figure 4:
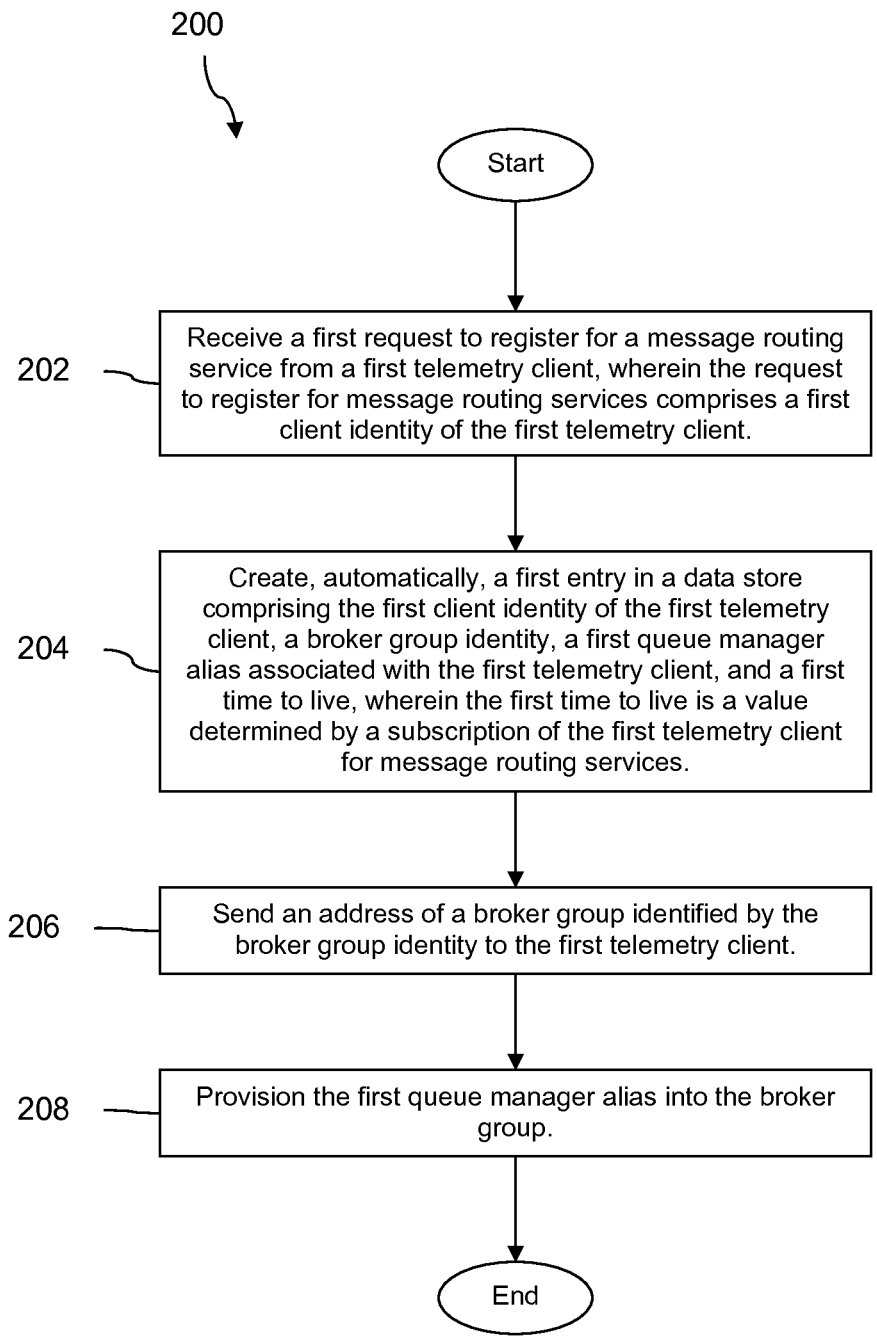
FIG. 4 is a flow chart of a method according to an embodiment of the disclosure.

In FIG. 4, a method 200 is described. At block 202, a provisioning system receives a first request to register for a message routing service from a first telemetry client, wherein the request to register for message routing services comprises a first client identity of the first telemetry client. At block 204, a first entry is automatically created in a data store comprising the first client identity of the first telemetry client, a broker group identity, a first queue manager alias associated with the first telemetry client, and a first time to live, wherein the first time to live is a value determined by subscription of the first telemetry client for message routing services. At block 206, an address of a broker group identified by the broker group identity to the first telemetry client is sent. At block 208, the first queue manager alias is provisioned into the broker group.

Figure 5:
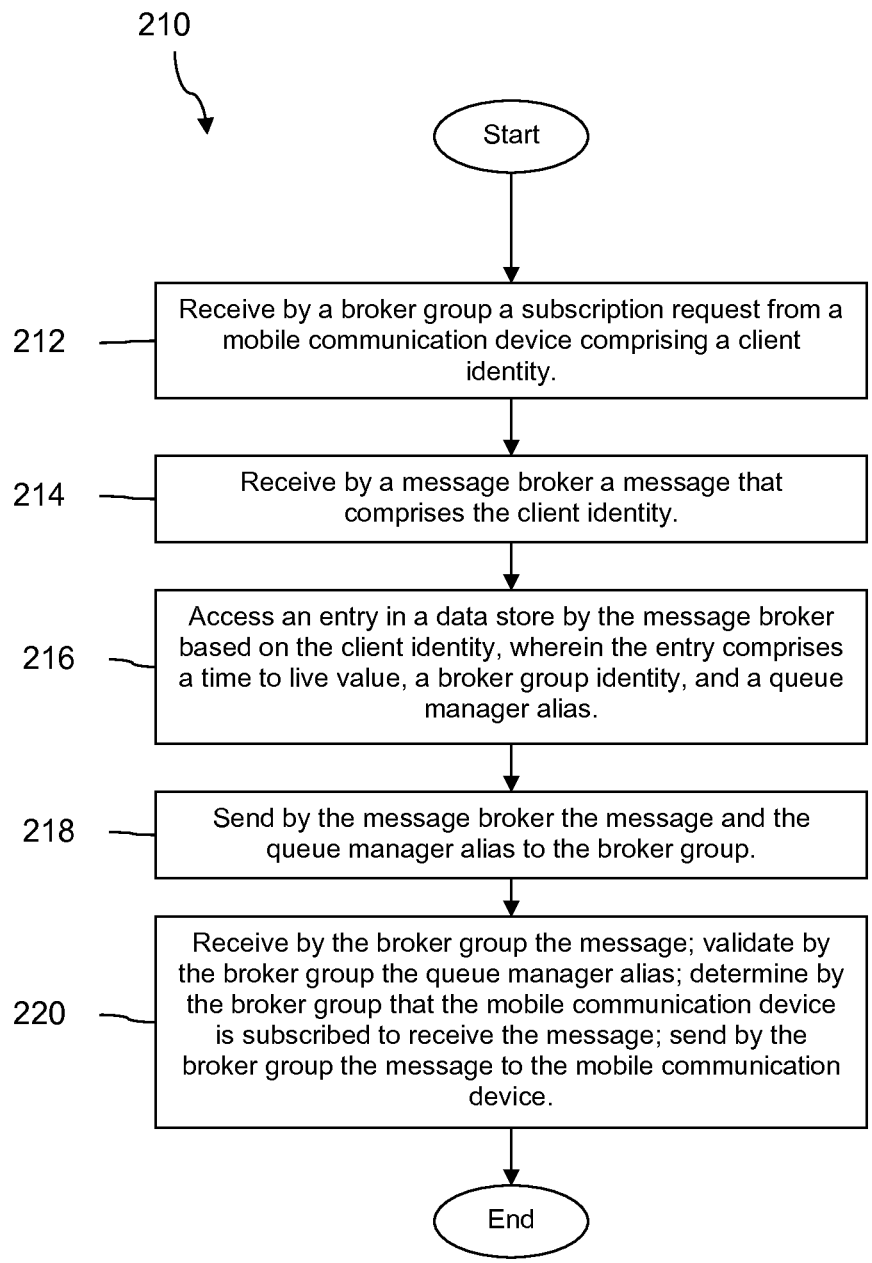
FIG. 5 is a flow chart of a method according to an embodiment of the disclosure.

In FIG. 5, a method 210 is described. At block 212, an application function receives by a broker group a subscription request from a mobile communication device comprising a client identity. At block 214, a message broker receives a message that comprises the client identity. At block 216, an entry in a data store is accessed by the message broker based on the client identity, wherein the entry comprises a time to live value, a broker group identity, and a queue manager alias. At block 218, a message is sent by the message broker containing the queue manager alias to the broker group. At block 220, the message is received by the broker group; the broker group validates the queue manager alias; the broker group determines that the mobile communication device is subscribed to receive the message; the broker group sends the message to the mobile communication device after the checks are completed.

Figure 6:
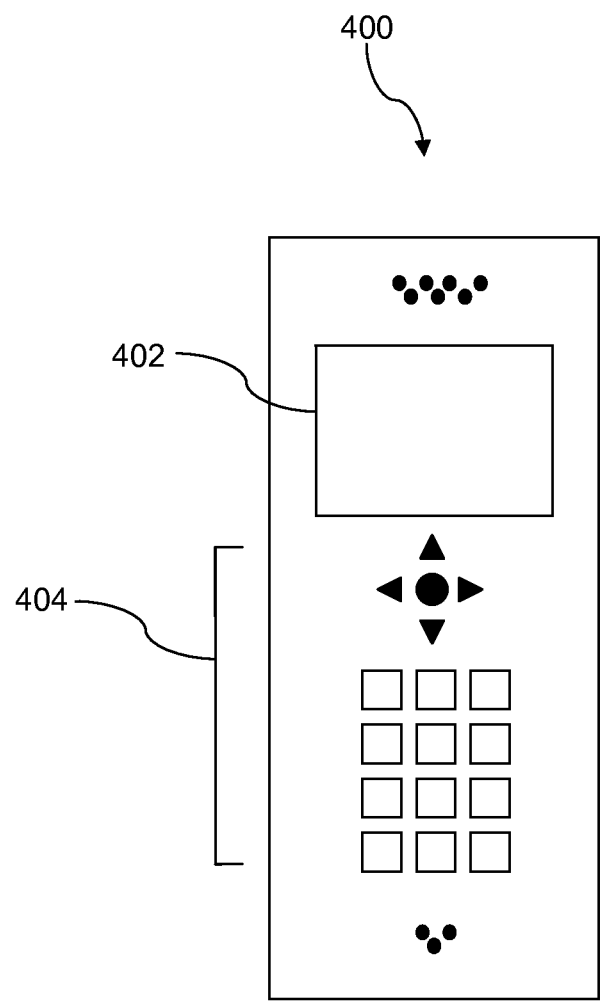
FIG. 6 is an illustration of a mobile communication device according to an embodiment of the disclosure.

FIG. 6 depicts a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
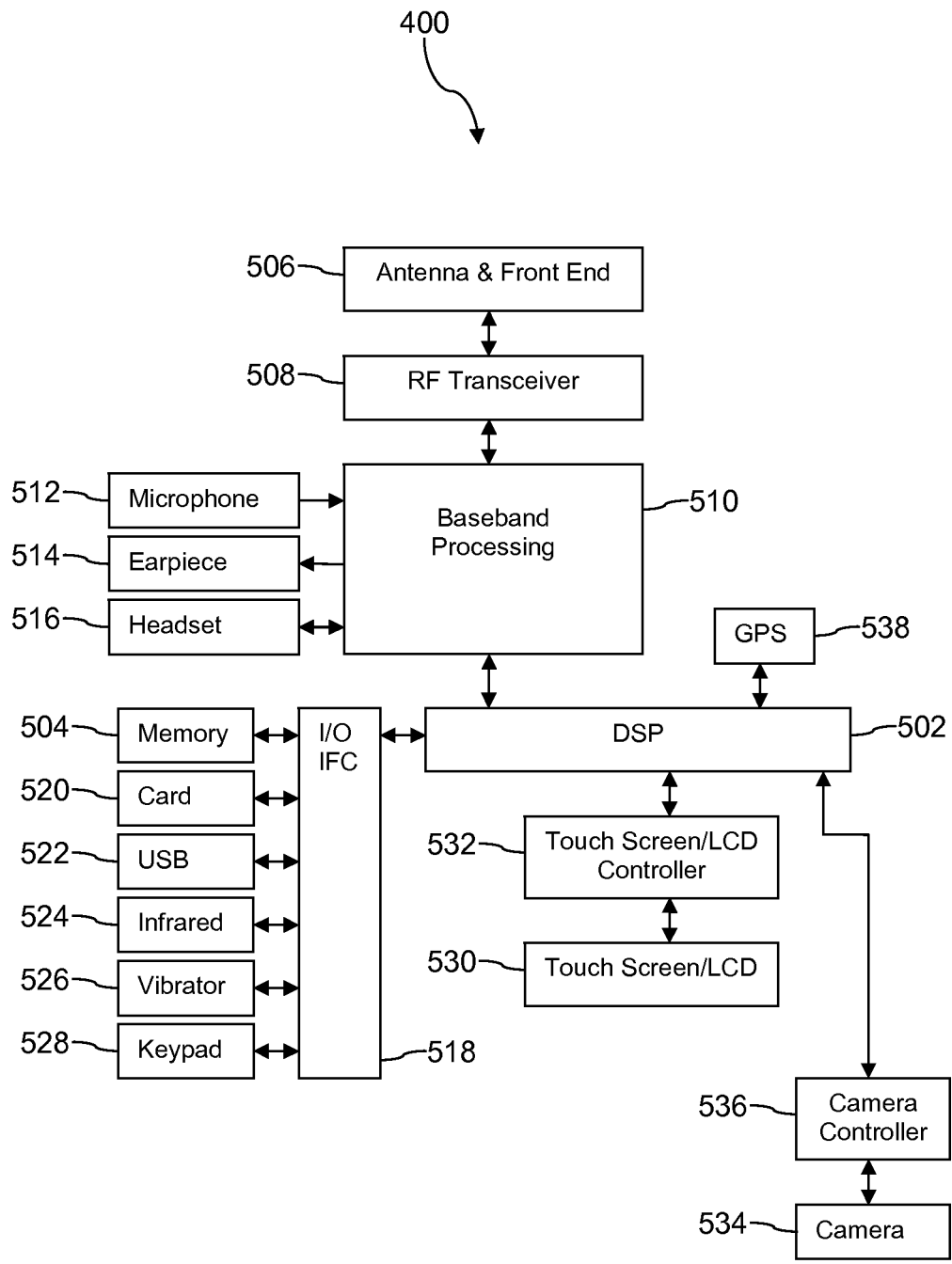
FIG. 7 is a block diagram of a mobile communication device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
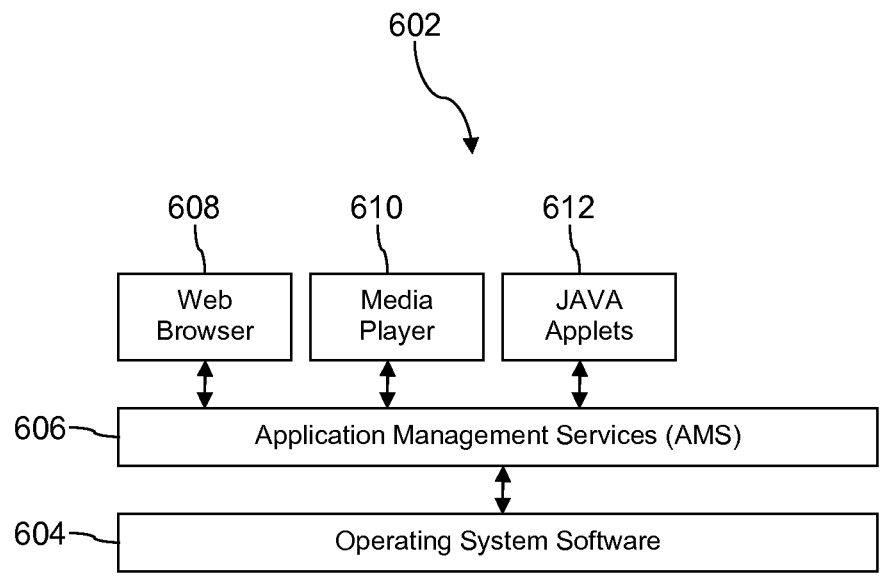
FIGS. 8A and 8B are block diagrams of software architecture for a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
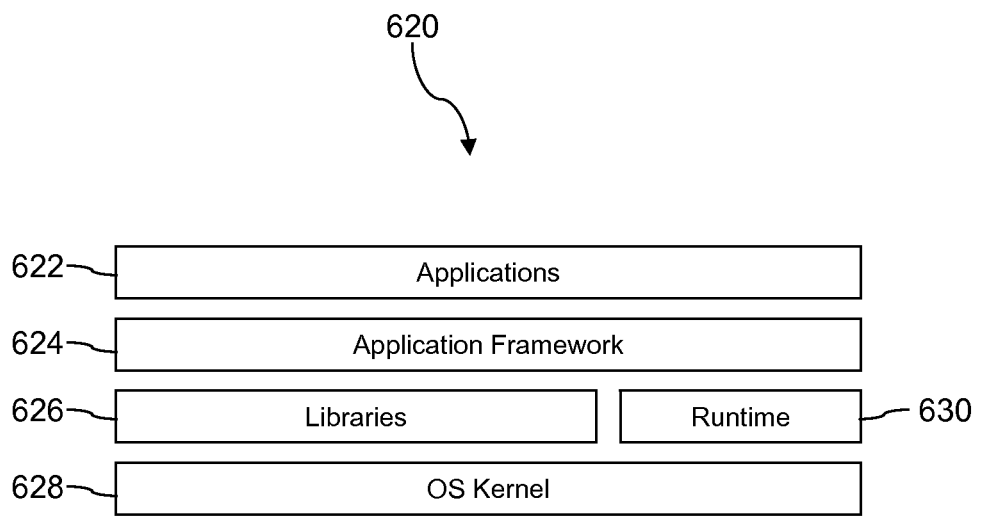

FIG. 8B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
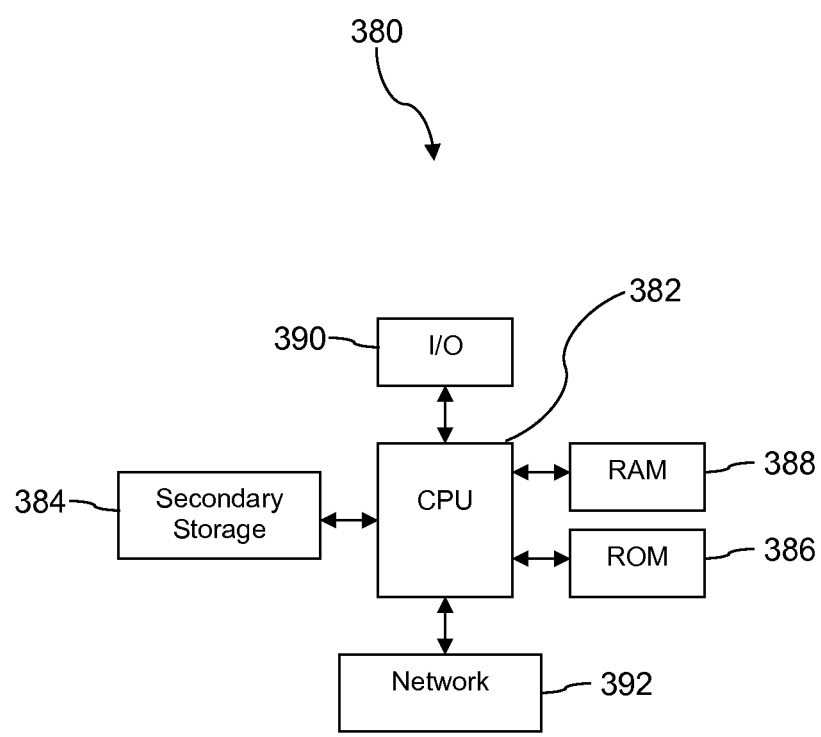
FIG. 9 illustrates an exemplary computer system suitable for implementing the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer specification 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dynamic telemetry client message routing system, comprising:
   at least one computer system, each computer system comprising at least one memory and at least one processor;
   a provisioning service application stored in a memory of the at least one computer system that, when executed by a processor of the at least one computer system,
      receives a request from a telemetry client to register for message routing services, the request comprising a client identity of the telemetry client,
      in response to the request to register for message routing services, creates an entry in a data store associating the client identity with a broker group identity and a queue manager alias and comprising a time to live value, and
      sends a request to a route builder application to configure the queue manager alias into a broker group identified in the entry in the data store;
   the route builder application stored in a memory of the at least one computer system that, when executed by a processor of the at least one computer system,
      receives a request from the provisioning service application to configure the queue manager alias into the identified broker group,
      sends a message to the identified broker group to configure the queue manager alias into the identified broker group, and
      removes entries from the data store that comprise an expired time to live; and a message broker stored in a memory of the at least one computer system that, when executed by a processor of the at least one computer system,
  receives a request to send a message to the telemetry client, wherein the request to send the message comprises the client identity of the telemetry client,
  accesses the data store and retrieves the queue manager alias and the broker group identity based on the client identity of the telemetry client, and
  transmits the message and the queue manager alias to the broker group accessed from the data store.

2. The system of claim 1, wherein the provisioning service application, the route builder application, and the message broker execute on the same computer system.

3. The system of claim 1, wherein at least two of the provisioning service application, the route builder application, and the message broker execute on different computer systems.

4. The system of claim 1, wherein the route builder application further removes queue manager aliases from the identified broker group, where the removed queue manager aliases are associated with entries in the data store that comprise an expired time to live.

5. The system of claim 1, wherein the time to live value is determined by the provisioning service application based on a subscription of the telemetry client.

6. The system of claim 1, further comprising an enterprise application stored in a memory of the at least one computer system that, when executed by a processor of the at least one computer system,
  connects to the message broker to wait for incoming messages from telemetry clients,
  receives a second message from a second telemetry client, processes the second message to build the message, and sends the message to the message broker.

7. The system of claim 6, wherein the second message comprises the client identity and a topic identity, and wherein the enterprise application is subscribed to receive messages about the topic identity.

8. The system of claim 7, wherein the topic identity is a door unlock command, wherein the telemetry client is installed in a telematics unit of a vehicle, and wherein when the telemetry client receives the message it commands the telematics unit to unlock the doors of the vehicle.

9. The system of claim 6, further comprising the identified broker group stored in a memory of the at least one computers system that, when executed by a processor of the at least one computer system,
  receives the message and the queue manager alias from the message broker,
  verifies that the queue manager alias is configured in the identified broker group,
  verifies that the enterprise application is authorized to send the message, and
  sends the message to the telemetry client.

10. A method of provisioning a dynamic telemetry client message routing system, comprising:
  receiving, by executing a provisioning service application that configures a processor of a computer system, a first request to register for message routing services from a first telemetry client, wherein the request to register for message routing services comprises a first client identity of the first telemetry client;
  in response to receiving the first request to register for message routing services, automatically creating, by executing the provisioning service application, a first entry in a data store comprising the first client identity of the first telemetry client, a broker group identity, a first queue manager alias associated with the first telemetry client, and a first time to live value, wherein the first time to live value is determined based on a subscription of the first telemetry client for message routing service;
  provisioning, by execution of a route builder application in response to a request from the provisioning service application, the first queue manager alias into a broker group identified in the first entry in the data store; and
  in response to provisioning the first queue manager alias into the broker group, sending, by the provisioning application, an address of the broker group identified by the broker group identity to the first telemetry client that persists a queue manager alias configuration to memory.

11. The method of claim 10, wherein the address of the broker group includes an internet protocol address and port number of the broker group.

12. The method of claim 10, wherein the first telemetry client is installed in one of a mobile phone, a telematics unit of a vehicle, or a sensor.

13. The method of claim 10, wherein the time to live value is one of a month, three months, six months, a year, or two years.

14. The method of claim 13, further comprising:
  receiving a second request to register for message routing services from a second telemetry client, wherein the request to register for message routing services comprises a second client identity of the second telemetry client;
  in response to receiving the second request to register for message routing services automatically creating a second entry in the data store comprising the second client identity of the second telemetry client, the broker group identity, a second queue manager alias associated with the second telemetry client, and a second time to live, wherein the second time to live is a value determined by a subscription of the second telemetry client for message routing service;
  sending an address of the broker group identified by the broker group identity to the second telemetry client; and
  provisioning the second queue manager alias into the broker group.

15. A method of transmitting a control command to a telemetry client via a mobile communication device, comprising:
  receiving, by executing a broker group that configures a processor of a computer system, an application message from a mobile communication device comprising a client identity, wherein the application message comprises the client identity and a topic identity that requests transmission of a control command to the telemetry client that executes in a vehicle telematics unit;
  receiving, by a message broker forwarded from the broker group, the application message that comprises the client identity;
  identifying, by the message broker, a location of an enterprise application based on a header of the application message;
  obtaining, by the message broker, an identity of the telemetry client from the enterprise application;
  accessing, by the message broker, an entry in a data store based on the identity of the telemetry client for validation, wherein the entry comprises a time to live value, a broker group identity of a second broker group, and a queue manager alias;

sending, by the message broker to the second broker group, a validation request message comprising the queue manager alias;

receiving, by the second broker group, the validation request message;

based on reception of the validation request message, validating, by the second broker group, that the queue manager alias is configured into the second broker group and that the enterprise application is authorized to send the control command for the telemetry client;

determining, by the second broker group, that the mobile communication device is subscribed for message routing services; and sending by the second broker group via the enterprise application, a message comprising the control command to the telemetry client of the vehicle telematics unit.

16. The method of claim 15, wherein the client identity is a code that is associated with a particular device.

17. The method of claim 15, wherein the broker group comprises a broker, the queue manager alias, a transmit queue, a message queue manager, and a channel agent.

18. The method of claim 17, wherein the transmit queue couples the message queue manager to the broker in the broker group.

19. The method of claim 15, wherein the mobile communication device receives a return message that includes a notification of a validation of a subscription for message routing service.

20. The method of claim 15, wherein the enterprise application initiates performance of the control command by the telemetry client of the vehicle telematics unit, and wherein the control command initiates performance of at least one of: locking a vehicle door, unlocking a vehicle door, or remote startup of a vehicle.

* * * * *